(12) United States Patent
Shimodate et al.

(10) Patent No.: US 12,466,176 B2
(45) Date of Patent: Nov. 11, 2025

(54) SHEET LAMINATOR AND IMAGE FORMING SYSTEM INCORPORATING THE SHEET LAMINATOR

(71) Applicants: Kazuki Shimodate, Kanagawa (JP); Keisuke Sugiyama, Kanagawa (JP); Yuichiro Kato, Kanagawa (JP); Shota Yoshida, Kanagawa (JP); Takaya Ochiai, Kanagawa (JP); Naoki Takai, Tokyo (JP); Yosuke Saito, Kanagawa (JP)

(72) Inventors: Kazuki Shimodate, Kanagawa (JP); Keisuke Sugiyama, Kanagawa (JP); Yuichiro Kato, Kanagawa (JP); Shota Yoshida, Kanagawa (JP); Takaya Ochiai, Kanagawa (JP); Naoki Takai, Tokyo (JP); Yosuke Saito, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 313 days.

(21) Appl. No.: 18/206,624

(22) Filed: Jun. 7, 2023

(65) Prior Publication Data
US 2023/0398775 A1    Dec. 14, 2023

(30) Foreign Application Priority Data

Jun. 10, 2022   (JP) .................................. 2022-094308
Apr. 7, 2023   (JP) .................................. 2023-062618

(51) Int. Cl.
*B32B 41/00*      (2006.01)
*B32B 37/00*      (2006.01)
*B32B 38/00*      (2006.01)

(52) U.S. Cl.
CPC .......... *B32B 41/00* (2013.01); *B32B 37/0053* (2013.01); *B32B 38/145* (2013.01);
(Continued)

(58) Field of Classification Search
CPC .... B32B 2037/0061; B32B 2037/0069; B32B 2041/04; B32B 2309/02; B32B 2309/04;
(Continued)

(56) References Cited

U.S. PATENT DOCUMENTS 5,306,381 A  *  4/1994  Nakazawa .............. B32B 38/14
                                                      219/508
2021/0039904 A1   2/2021  Sugiyama
(Continued)

FOREIGN PATENT DOCUMENTS

JP    2003-285370    10/2003
JP    2011-221261    11/2011

OTHER PUBLICATIONS

Translation of EP0640473.*
(Continued)

*Primary Examiner* — Sonya M Sengupta
(74) *Attorney, Agent, or Firm* — XSENSUS LLP

(57) ABSTRACT

A sheet laminator includes a fuser pressure member, a heater, a drive device, and circuitry. The fuser pressure member thermally fixes a two-ply sheet and a sheet medium inserted between two sheets of the two-ply sheet. The heater heats the fuser pressure member. The driver rotates the fuser pressure member. In response to a pause of a rotation of the fuser pressure member, the circuitry turns off a power supply to the heater, and perform one of immediately stopping the fuser pressure member or rotating the fuser pressure member and stopping the fuser pressure member after the rotation of the fuser pressure member, based on a state of the fuser pressure member.

17 Claims, 12 Drawing Sheets

(52) U.S. Cl.
CPC ... *B32B 2037/0069* (2013.01); *B32B 2309/02* (2013.01); *B32B 2309/04* (2013.01); *B32B 2309/14* (2013.01); *B32B 2317/12* (2013.01)

(58) Field of Classification Search
CPC ............ B32B 2309/14; B32B 2317/12; B32B 37/0053; B32B 37/142; B32B 37/185; B32B 38/145; B32B 41/00
See application file for complete search history.

(56) References Cited

U.S. PATENT DOCUMENTS

2021/0347589 A1    11/2021  Suzuki et al.
2023/0398775 A1*  12/2023  Shimodate .......... B32B 37/0053

OTHER PUBLICATIONS

Translation of ES_2226855.*
Translation of KR 101994604.*
Translation of CN104401099.*
U.S. Appl. No. 17/969,148, filed Oct. 19, 2022, Shinya Monma, et al.
U.S. Appl. No. 18/060,256, filed Nov. 30, 2022, Wataru Takahashi, et al.
U.S. Appl. No. 18/061,232, filed Dec. 2, 2022, Keisuke Sugiyama, et al.
U.S. Appl. No. 17/974,987, filed Oct. 27, 2022, Sho Asano, et al.
Extended European Search Report issued Nov. 3, 2023, in corresponding European Patent Application No. 23176741.9, 5pp.

* cited by examiner

SHEET LAMINATOR AND IMAGE FORMING SYSTEM INCORPORATING THE SHEET LAMINATOR

CROSS-REFERENCE TO RELATED APPLICATIONS

This patent application is based on and claims priority pursuant to 35 U.S.C. § 119(a) to Japanese Patent Application Nos. 2022-094308, filed on Jun. 10, 2022, and 2023-062618, filed on Apr. 7, 2023, in the Japan Patent Office, the entire disclosure of each of which is hereby incorporated by reference herein.

BACKGROUND

Technical Field

Embodiments of the present disclosure relate to a sheet laminator and an image forming system incorporating the sheet laminator.

Background Art

Various types of image forming apparatuses such as printers or copiers include a fixing device that includes a fixing roller pair to fix a toner image formed on a sheet by application of heat and pressure. Image forming apparatuses in the related art are known that are provided with a sheet lamination mode capable of performing an operation in which a lamination sheet that is a sheet sandwiched by two lamination films is conveyed to the fixing device where one sides of the lamination films are melted and bonded together i.e., sheet laminating operation).

In an image forming apparatus in the related art having a typical sheet lamination mode, the fixing device of the image forming apparatus applies thermal energy to the lamination films to be melted and bonded together when the sheet laminating operation is performed. However, when any abnormal condition such as misfeeding occurs, the operation of the image forming apparatus is stopped from a safety point of view and the power to the heater provided for the fixing device is turned off. For this reason, when the image forming apparatus stops at high temperature during the sheet laminating operation, the rotation of the fixing roller pair also stops at high temperature. As a result, heat is concentrated on the nip region of the fixing roller pair, which causes damage on the rollers such as deformation of the fixing roller pair in the nip region, as illustrated in FIG. 13.

For this reason, as the abnormal condition handling, the fixing roller pair is rotated for a certain period of time to radiate heat after the power to the heater of the fixing device is immediately turned off (hereinafter, also referred to as "immediate turnoff of the heater"). By so doing, the deformation of the fixing roller pair in the nip region can be prevented, as illustrated in FIG. 14. However, although the degree of damage on the rollers of the fixing roller pair varies depending on the temperature of the fixing roller pair and the heater lighting percentage before the abnormal condition handling, rotating the fixing roller pair for a certain period of time makes the period of the stopping process unnecessarily long regardless of these conditions, and also makes the waiting time before restarting the job long.

An image forming apparatus in the related art includes a fixing device that determines that the state of the fixing device is an abnormal condition when the detected temperature of the heat roller is higher than the upper limit temperature of the permissible temperature range, stops the heating of the heat roller by the halogen lamp, and rotate the heat roller. This operation is performed to prevent the heat roller of the fixing device from being damaged even when the temperature of the heat roller reaches an abnormally high temperature in the fixing device of the image forming apparatus in the related art.

The above-described operation employs a technique related to a stop control of the heat roller at the time of occurrence of an abnormal condition. However, rotating the heat roller for a certain period of time takes a long time to end the stopping process, and also takes a long time to restart the job.

SUMMARY

Embodiments of the present disclosure described herein provide a novel sheet laminator includes a fuser pressure member, a heater, a driver, and circuitry. The fuser pressure member thermally fixes a two-ply sheet and a sheet medium inserted between two sheets of the two-ply sheet. The heater heats the fuser pressure member. The driver rotates the fuser pressure member. In response to a pause of a rotation of the fuser pressure member, the circuitry turns off a power supply to the heater, and perform one of immediately stopping the fuser pressure member or rotating the fuser pressure member and stopping the fuser pressure member after the rotation of the fuser pressure member, based on a state of the fuser pressure member.

Further, embodiments of the present disclosure described herein an image forming system including provide the above-described sheet laminator, and an image forming apparatus to form an image on the sheet medium to be supplied to the sheet laminator.

BRIEF DESCRIPTION OF THE SEVERAL VIEWS OF THE DRAWINGS

Exemplary embodiments of this disclosure will be described in detail based on the following figures, wherein.

Figure 1:
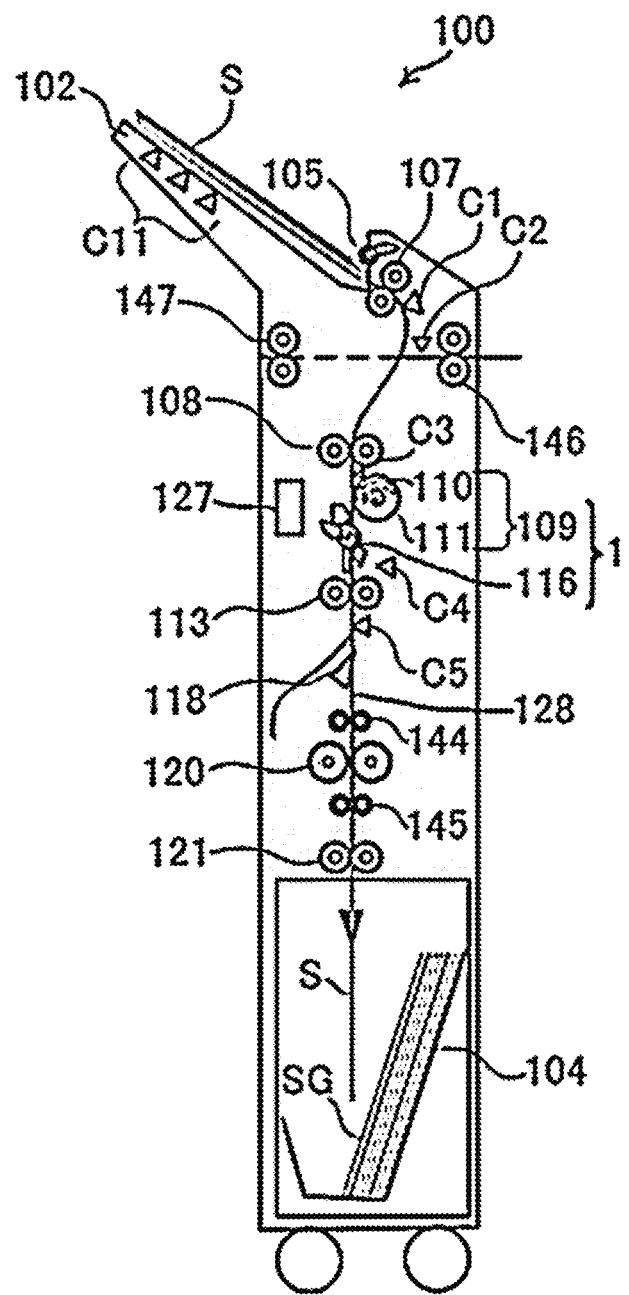
FIG. 1 is a diagram illustrating an overall configuration of a sheet laminator according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

It will be understood that if an element or layer is referred to as being "on," "against," "connected to" or "coupled to" another element or layer, then it can be directly on, against, connected or coupled to the other element or layer, or intervening elements or layers may be present. In contrast, if an element is referred to as being "directly on," "directly connected to" or "directly coupled to" another element or layer, then there are no intervening elements or layers present. As used herein, the term "connected/coupled" includes both direct connections and connections in which there are one or more intermediate connecting elements. Like numbers refer to like elements throughout. As used herein, the term "and/or" includes any and all combinations of one or more of the associated listed items.

Spatially relative terms, such as "beneath," "below," "lower," "above," "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular fern's "a," "an," and "the" are intended to include the plural forms as well, unless the context clearly indicates otherwise. It will be further understood that the terms "includes" and; or "including," when used in this specification, specify the presence of stated features, integers, steps, operations, elements, and/or components, but do not preclude the presence or addition of one or more other features, integers, steps, operations, elements, components, and; or groups thereof.

Referring now to the drawings, embodiments of the present disclosure are described below. In the drawings for explaining the following embodiments, the same reference codes are allocated to elements (members or components) having the same function or shape and redundant descriptions thereof are omitted below.

A description is given of a sheet processing device according to an embodiment of the present disclosure, with reference to FIG. 1.

FIG. 1 is a schematic diagram illustrating an overall configuration of a sheet laminator according to an embodiment of the present disclosure.

A sheet laminator 100 according to the present embodiment is to separate two sheets (plies) of a two-ply sheet (hereinafter referred to as a lamination sheet S) and to insert and sandwich a sheet-shaped medium (hereinafter referred to as an inner sheet P) between the separated sheets of the two-ply sheet.

The lamination sheet S is a two-ply sheet in which two sheets are overlapped and bonded together at a portion (or a side) of the two-ply sheet. For example, a two-ply sheet has two sheets (two sides). A first side of the two-ply sheet serves as a transparent sheet such as a transparent polyester sheet, a second side of the two-ply sheet serves as a transparent or opaque sheet is disposed facing the first side, and the first and second sides are bonded at one side of the two-ply sheet. The two-ply sheet also includes a lamination film.

The inner sheet P is an example of the sheet medium that is inserted into the two-ply sheet. The sheet medium may be, for example, thick paper, postcards, envelopes, plain paper, thin paper, coated paper, art paper, tracing paper, and overhead projector (OHP) transparencies.

As illustrated in FIG. 1, the sheet laminator 100 includes a sheet tray 102 serving as a first stacker that stacks lamination sheets 5, a pickup roller 105 that feeds the lamination sheets S from the sheet tray 102, and first conveyance roller pair 107. The sheet tray 102 of the sheet laminator 100 is provided with a plurality of size detection sensors C11 for detecting the size of the lamination sheet S.

A lamination sheet S into which an inner sheet has been inserted is ejected and stacked on the sheet ejection tray 104 by a third conveyance roller pair 113 or a roller disposed downstream from the third conveyance roller pair 113. The sheet ejection tray 104 is disposed inside a housing of the sheet laminator 100, Such a configuration facilitates a vertical conveyance of the lamination sheet S toward the sheet ejection tray 104.

A conveyance sensor C1 is disposed downstream from the first conveyance roller pair 107 in the sheet conveyance direction to detect the sheet conveyance position of the lamination sheet S.

A conveyance sensor C2 is disposed downstream from an entrance roller pair 146 and upstream from an exit roller pair 147 in the sheet conveyance direction to detect the sheet conveyance position of the inner sheet P.

The sheet laminator 100 further includes, for example, a second conveyance roller pair 108, a winding roller 109 serving as a rotary member, a third conveyance roller pair 113, a fourth conveyance roller pair 144, a fifth conveyance roller pair 145, an ejection roller pair 121, and the sheet ejection tray 104, disposed downstream from the first conveyance roller pair 107 in the sheet conveyance direction. The sheet laminator 100 further includes separation members 116 disposed between the winding roller 109 and the third conveyance roller pair 113. The separation members 116 are movable in the width direction of the lamination sheet S. The separation members 116 serve as a separator that separates the lamination sheet S according to the present embodiment.

A sheet conveyance sensor C3 is disposed downstream from the second conveyance roller pair 108 in the sheet conveyance direction to detect the conveyance position of the lamination sheet S and the sheet conveyance position of the inner sheet P.

An abnormal condition detection sensor C4 is disposed downstream from the winding roller 109 in the sheet conveyance direction to detect the condition of the lamination sheet S.

A conveyance sensor C5 that detects the conveyance position of the lamination sheet S is disposed downstream from the third conveyance roller pair 113 in the sheet conveyance direction.

The pickup roller 105, the first conveyance roller pair 107, the second conveyance roller pair 108, and the winding roller 109 are some examples of a first feeder.

In FIG. 1, each set of the second conveyance roller pair 108 and the third conveyance roller pair 113 is, for example, a pair of two rollers and is rotationally driven by a drive device (e.g., a motor). The second conveyance roller pair 108 rotates in one direction. The third conveyance roller pair 113 rotates in forward and reverse directions, thereby nipping and conveying the lamination sheet S and the inner sheet P.

The second conveyance roller pair 108 conveys the lamination sheet S and the inner sheet P vertically downward toward the third conveyance roller pair 113.

On the other hand, the third conveyance roller pair 113 can switch the direction of rotation between the forward direction and the reverse direction that is a direction opposite to the forward direction. The third conveyance roller pair 113 can nip and convey the lamination sheet S vertically downward toward the sheet ejection tray 104 and also convey the lamination sheet S vertically upward toward the winding roller 109 in the reverse direction, that is, a direction to pull back the lamination sheet S.

The sheet laminator 100 further includes a sheet separation device 1 between the second conveyance roller pair 108 and the third conveyance roller pair 113. The sheet separation device 1 includes the winding roller 109 serving as a rotary member and the separation members 116. The winding roller 109 is driven by a winding roller motor 109a (see FIG. 4) that serves as a drive unit to rotate in the forward and reverse directions. The direction of rotation of the winding roller 109 is switchable between the forward direction (clockwise direction) and the reverse direction (counterclockwise direction).

The winding roller 109 includes a roller 111 and a sheet gripper 110 movably disposed on the roller 111 to grip the sheet. S, The sheet gripper 110 is driven by a sheet gripper motor 110a (see FIG. 4) to be rotatable with the roller 111. The sheet gripper 110 grips the leading end of the lamination sheet S with the roller 111. In the present embodiment, the sheet gripper 110 and the roller 111 are separate units. However, the sheet gripper 110 may be formed on the outer circumference of the roller 111 as a single unit serving as a handle.

A description is now given of a series of operations performed in the sheet laminator 100, with reference to FIG. 1. The series of operations performed by the sheet laminator 100 indicates the operations from separating the lamination sheet S to inserting the inner sheet P into the lamination sheet S.

In FIG. 1, multiple lamination sheets S are stacked on the sheet tray 102 such that a bonded end of each of the multiple lamination sheets S is located downstream from the pickup roller 105 in the sheet feed direction (sheet conveyance direction). The sheet laminator 100 picks the lamination sheet S on the sheet tray 102 by the pickup roller 105 and conveys the lamination sheet S toward the first conveyance roller pair 107.

The lamination sheet S is then conveyed toward the winding roller 109 by the second conveyance roller pair 108 disposed downstream from the first conveyance roller pair 107 in the sheet conveyance direction. In the sheet laminator 100, the second conveyance roller pair 108 conveys the lamination sheet S with the bonded end, which is one of four sides of the lamination sheet S, as a downstream end in the vertical direction (i.e., a vertically downward direction).

Subsequently, when the trailing end of the lamination sheet S in the vertical direction (i.e., the vertically downward direction) passes by the winding roller 109, the sheet laminator 100 temporarily stops the conveyance.

The sheet laminator 100 then opens the sheet gripper 110, reverses the rotation direction of the third conveyance roller pair 113, and conveys the lamination sheet S vertically upward toward the opening of the sheet gripper 110.

Subsequently, the sheet laminator 100 stops rotation of the third conveyance roller pair 113 to stop conveyance of the lamination sheet S when the trailing end of the lamination sheet S is inserted into the opened portion of the sheet gripper 110, and closes the sheet gripper 110 to grip the trailing end of the lamination sheet S. These operations are performed when the lamination sheet S is conveyed by the designated amount.

The sheet laminator 100 then rotates the winding roller 109 in the clockwise direction to wind the lamination sheet S around the winding roller 109. The lamination sheet S is wound around the winding roller 109 from the side where the two sheets of the lamination sheet S are overlapped but not bonded.

When the lamination sheet S that is the two-ply sheet is wound around the winding roller 109, a winding circumferential length difference (in other words, a winding circumferential amount difference) is created between the two sheets in the amount of winding of the lamination sheet S around the circumference of the winding roller 109. There is a surplus of the sheet on the inner circumferential side to the center of the winding roller 109, which generates a slack toward the bonded end. As a result, a space is created between the two sheets of the lamination sheet S. As the separation members 116 are inserted into the space formed as described above, from opposed sides of the lamination sheet S, the space between the two sheets is reliably maintained. In response to detection of the leading end of the lamination sheet S with the sheet conveyance sensor C5, the lamination sheet S is conveyed from the sheet conveyance sensor C5 by a designated amount to perform these operations.

The sheet laminator 100 rotates the winding roller 109 counterclockwise in a state where the separation members 116 are inserted into the space generated in the lamination sheet S, and moves the space where the lamination sheet S is separated to the trailing end of the lamination sheet S in the vertical direction (i.e., the vertically downward direction). After the winding roller 109 has been rotated by a designated amount, the sheet laminator 100 causes the sheet gripper 110 to open. As a result, the lamination sheet S is separated into the upper and lower sheets at the trailing end.

In this state, the sheet laminator 100 causes the driver to temporarily stop the conveyance of the lamination sheet S and to further move the separation members 116 in the width direction of the lamination sheet S from both ends toward the center to separate the whole area of the trailing end of the lamination sheet S. In response to detection of the leading end of the lamination sheet S with the sheet conveyance sensor C5, the lamination sheet S is conveyed from the sheet conveyance sensor C5 by a designated amount to perform these operations.

The sheet laminator 100 then rotates the third conveyance roller pair 113 counterclockwise to convey the lamination sheet S in the reverse conveyance direction. A branching member 118 can be switched at the time when the leading end of the lamination sheet S passes through the conveyance sensor C5. When the lamination sheet S is conveyed to the non-thermal pressure conveyance passage, the branching member 118 remains at the position illustrated in FIG. 1. When the lamination sheet S is to be conveyed to a thermal pressure conveyance passage 128, the branching member 118 is switched to the side where the lamination sheet S is guided to the thermal pressure conveyance passage 128.

The separation members 116 guide the two sheets separated from the lamination sheet S in the right and left directions in FIG. 1, and thus the two sheets are fully separated. Then, the sheet laminator 100 temporarily stops the conveyance of the lamination sheet S and brings the joined portion of the lamination sheet S into a state of being gripped (nipped) by the third conveyance roller pair 113. Accordingly, one end of the lamination sheet S is bonded as the bonded side of the lamination sheet S and the other end of the lamination sheet S is opened largely.

In response to the detection of the leading end of the lamination sheet S with the sheet conveyance sensor C5, the lamination sheet S is conveyed from the sheet conveyance sensor C5 by a designated amount to perform these operations.

The sheet laminator 100 then rotates the second conveyance roller pair 108 to convey the inner sheet P conveyed from the image forming apparatus side vertically downward toward the third conveyance roller pair 113. The image forming apparatus will be described below with reference to FIG. 7.

Subsequently, the sheet laminator 100 rotates the third conveyance roller pair 113 to merge the lamination sheet S and the inner sheet P, and inserts the inner sheet P into the opened lamination sheet S.

The operation from separation (peeling) of the lamination sheet S to insertion of the inner sheet P has been described above. As illustrated with reference letters SR in FIG. 8, the two sheets of the lamination sheet S are separated and conveyed separately in left and right directions respectively.

The sheet laminator 100 then causes the third conveyance roller pair 113 to convey the lamination sheet S, in which the inner sheet P has been inserted, downward in the vertical direction. Thus, the two sheets of the lamination sheet S overlap again and the opening of the lamination sheets S is closed. The lamination sheet S in which the inner sheet P has been sandwiched is conveyed to a fixing device having a thermal pressure roller pair 120 (corresponding to a fuser pressure member) as a pair of rollers by the third conveyance roller pair 113 or, for example, a roller disposed downstream from the third conveyance roller pair 113 in the sheet conveyance direction of the lamination sheet S.

When passing through the thermal pressure roller pair 120, the lamination sheet S is thermally pressed and fixed. After passing through the thermal pressure roller pair 120, the lamination sheet S continues to be conveyed vertically downward toward the sheet ejection tray 104 and is stacked on the sheet ejection tray 104. Since the lamination sheet S pressed after passing through the thermal pressure roller pair 120 is ejected vertically downward in this manner, the lamination sheet S can be stacked on the sheet ejection tray 104 while preventing the heated lamination sheet S from being bent by an external force.

More specifically, in the vertical conveyance according to the present embodiment, the lamination sheet S is ejected vertically downward. Accordingly, the gravity applied to the lamination sheet S is parallel to the tangent line of a fixing nip between the rollers of the thermal pressure roller pair 120, and an external force that may deform the lamination sheet S is not applied to the lamination sheet S. Thus, as long as the lamination sheet S continues to be ejected vertically, deformation of the lamination sheet S is reduced. The sheet ejection tray 104 is disposed after the trailing end of the lamination sheet S passes through the thermal pressure roller pair 120 and the ejection roller pair 121, and the lamination sheet S is cooled before reaching the sheet ejection tray 104. Accordingly, the inclination of the stacking surface of the sheet ejection tray 104 does not apply an external force that may deform the lamination sheet S to the lamination sheet S.

As the lamination sheet S is conveyed vertically downward, the lamination sheet S continues to be conveyed vertically downward until the leading end of the lamination sheet S reaches the thermal pressure roller pair 120 and the trailing end of the lamination sheet S completely passes through the thermal pressure roller pair 120. Accordingly, the vertical conveyance of the lamination sheet S is given, thus preventing the bending of the thermally-pressed lamination sheet S due to the external force.

The sheet laminator 100 performs a series of operations, in this order, of feeding the lamination sheet S, separating the lamination sheet S, inserting the inner sheet P into the lamination sheet S, and laminating the lamination sheet S with the inner sheet P being inserted, by application of heat and pressure, on a stand-alone basis. This series of operations is carried out automatically without any aid of a user, and therefore the sheet laminator 100 can enhance and provide the convenience better than a known sheet laminator employing a known technique, Since the sheet laminator 100 includes the fixing device including the thermal pressure roller pair 120 and can perform a sheet laminating operation, the sheet laminator 100 may be referred to as a lamination processing apparatus in a narrow sense.

Figure 2:
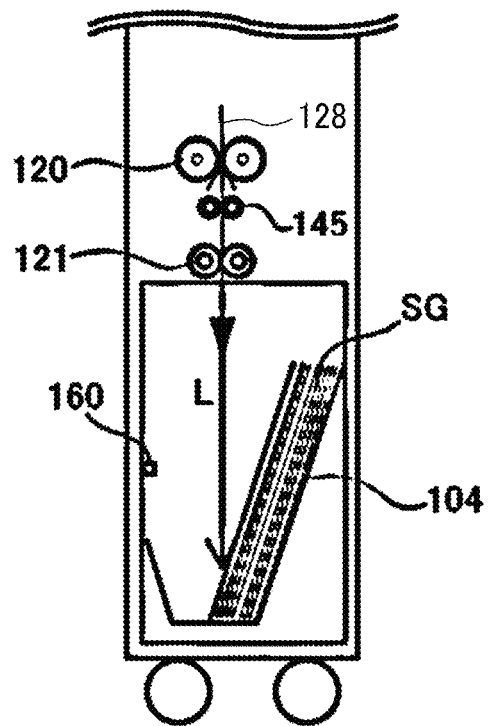
FIG. 2 is an enlarged view of a part of from a thermal pressure roller pair to a sheet ejection tray, according to an embodiment of the present disclosure.

FIG. 2 is an enlarged view of a part of from the thermal pressure roller pair 120 to the sheet ejection tray 104, according to an embodiment of the present disclosure.

In this example, multiple lamination sheets (laminated sheets SG) are stacked on the sheet ejection tray 104. As illustrated in FIG. 2, a distance L from the fixing nip region of the thermal pressure roller pair 120 to the stacking surface of the sheet ejection tray 104 or the uppermost surface of the laminated sheets SG stacked on the sheet ejection tray 104 on an extension line of a sheet conveyance passage is longer than the length of the lamination sheet S in the sheet conveyance direction. Accordingly, the leading end of the lamination sheet S does not contact the stacking surface of the sheet ejection tray 104 or the stacked laminated sheets SG until the trailing end of the lamination sheet S completely passes through the thermal pressure roller pair 120 thus preventing the heated lamination sheet S from being bent by an external force.

The sheet ejection tray 104 can stack lamination sheets S up to a thickness of, for example, 50 mm. In order to detect the full state of the laminated sheets SG, a tray full detection sensor 160 (e.g., a laser displacement meter) that serves as an optical sensor to detect the uppermost surface of the stacked laminated sheets SG is provided with the sheet ejection tray 104. In this case, the distance L is longer than the length of the lamination sheet S in the sheet conveyance direction at least up to the thickness of 50 mm of laminated sheets SG.

Figure 3:
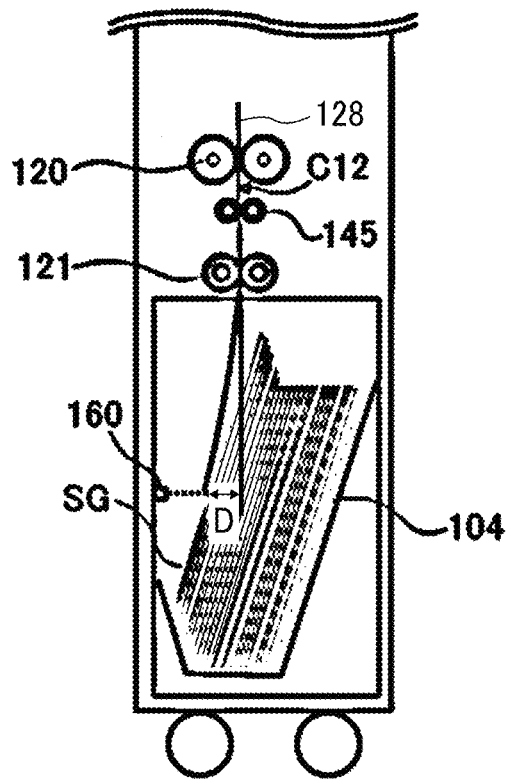
FIG. 3 is an enlarged view of a part of from a thermal pressure roller pair to a sheet ejection tray, according to another embodiment of the present disclosure.

FIG. 3 is an enlarged view of a part of from the thermal pressure roller pair 120 to the sheet ejection tray 104, according to another embodiment of the present disclosure.

In this example, more sheets (laminated sheets SG) than in the example illustrated in FIG. 2 are stacked on the sheet ejection tray 104. As illustrated in FIG. 3, when the leading end of the lamination sheet S during sheet ejection from the ejection roller pair 121 contacts the uppermost surface of the laminated sheets SG after fixing in the sheet ejection tray 104, the lamination sheet S is bent.

The sheet laminator 100 has a configuration in which a distance D between a contact point of the leading end of the lamination sheet S during sheet ejection and the uppermost surface of the laminated sheets SG and a vertical line passing through the nip region of the ejection roller pair 121 is equal to or less than 30 mm. For example, the tray full detection sensor 160 (for example, a laser-displacement meter) is disposed at the sheet ejection tray 104 to detect the distance to the uppermost sheet of the stacked laminated sheets SG that is at a position where the distance D is 30 mm. Such a configuration can determine whether the distance D is equal to or less than 30 mm.

Setting the distance D to be equal to or less than 30 mm can reduce the bending of the lamination sheet S and enhance the stacking performance, even if the leading end of the lamination sheet S contacts the uppermost surface of the laminated sheets SG during sheet ejection of the lamination sheet S. When the tray full detection sensor 160 detects that the distance D exceeds 30 mm, the sheet laminator 100 determines that the sheet ejection tray 104 is full, and stops fixing and conveying the lamination sheet S. Preventing the distance D from exceeding 30 mm in this manner can prevent the lamination sheet S from being largely bent when the leading end of the lamination sheet S contacts the uppermost surface of the laminated sheets SG during sheet ejection of the lamination sheet S, Note that the numerical value "30 mm" is merely an example, and is a numerical value determined by evaluating in advance the thickness of the lamination sheet S and the inner sheet P to be used depending on the specifications of the sheet laminator.

As illustrated in FIGS. 1 to 3, the ejection roller pair 121 that ejects the lamination sheet S toward the sheet ejection tray 104 are disposed downstream from the thermal pressure roller pair 120 in the sheet conveyance direction, Ejecting the lamination sheet S by the ejection roller pair 121 can reduce the formation of wrinkles on the lamination sheet S after thermal pressing. Ejecting the lamination sheet S in the vertical direction by the ejection roller pair 121 can reduce bending of the lamination sheet S after the thermal pressing.

Figure 4:
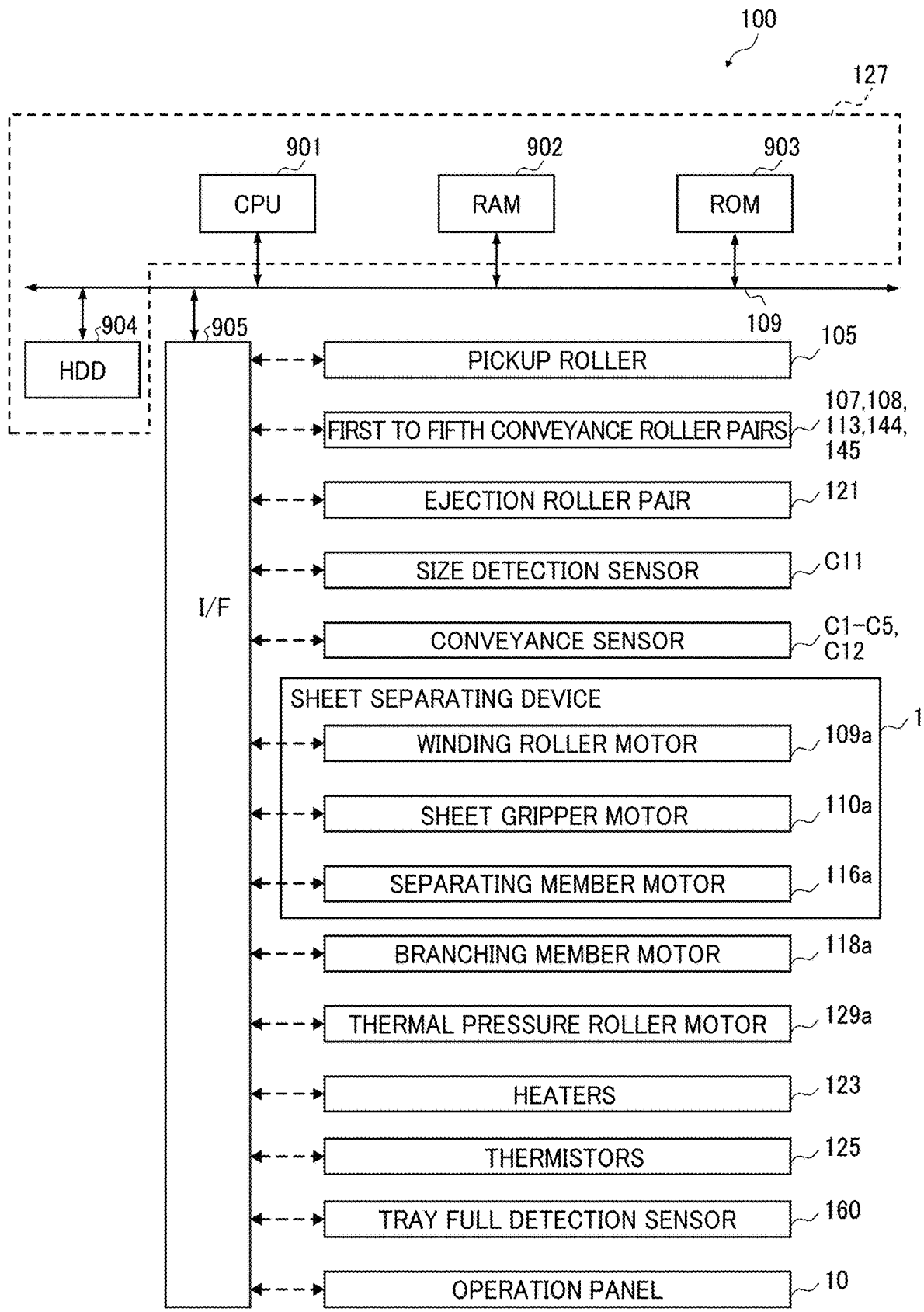
FIG. 4 is a block diagram illustrating a hardware configuration of the control block of the sheet laminator to control the operation of the sheet laminator.

FIG. 4 is a block diagram illustrating a hardware configuration for executing control processing executed in the sheet laminator 100.

As illustrated in FIG. 4, the sheet laminator 100 includes a central processing unit (CPU) 901, a random access memory (RAM) 902, a read only memory (ROM) 903, a hard disk drive (HDD) 904, and an interface (FT) 905. The CPU 901, the RAM 902, the ROM 903, the HDD 904, and the I/F 905 are connected to each other.

The CPU 901 is an arithmetic unit and controls the overall operation of the sheet laminator 100.

The RAM 902 is a volatile storage medium that allows data to be read and written at high speed. The CPU 901 uses the RAM 902 as a work area for data processing.

The ROM 903 is a read-only non-volatile storage medium that stores programs such as firmware. The HDD 904 is a non-volatile storage medium that allows data to be read and written and has a relatively large storage capacity.

The HDD 904 stores, e.g., an operating system (OS), various control programs, and application programs.

The sheet laminator 100 processes, by an arithmetic function of the CPU 901, e.g., a control program stored in the ROM 903 and an information processing program (or application program) loaded into the RAM 902. Such processing configures a software controller including various functional modules of the sheet laminator 100. The software controller thus configured cooperates with hardware resources of the sheet laminator 100 to construct functional blocks to implement functions of the sheet laminator 100. In other words, the CPU 901, the RAM 902, the ROM 903, and the HDD 904 implement a controller 127 (control unit) to control the operation of the sheet laminator 100.

The I/F 905 is an interface that connects the pickup roller 105, the first conveyance roller pair 107, the second conveyance roller pair 108, the third conveyance roller pair 113, the fourth conveyance roller pair 144, the fifth conveyance roller pair 145, the ejection roller pair 121, the size detection sensors C11, the conveyance sensors C1, C2, C3. C4, C5, and C12, the winding roller motor 109a, the sheet gripper motor 110a, a separation member motor 116a, a branching member motor 118a, a thermal pressure roller motor 129a, a heater 123 (corresponding to the heating device), thermistors 125 (corresponding to the temperature detector), the tray full detection sensor 160, and the operation panel 10 to the controller 127.

The controller 127 controls the operations of the pickup roller 105, the first conveyance roller pair 107, the second conveyance roller pair 108, the third conveyance roller pair 113, the fourth conveyance roller pair 144, the fifth conveyance roller pair 145, the ejection roller pair 121, the winding roller motor 109a, the sheet gripper motor 110a, the separation member motor 116a, the branching member motor 118a, the thermal pressure roller motor 129a, and the heater 123, via the IX 905. In addition, the controller 127 acquires detection results from the size detection sensor CH, the conveyance sensors C1, C2, C3, C4, C5, and C12, the thermistors 125, and the tray full detection sensor 160.

The winding roller motor 109a is a drive unit to drive the winding roller 109 in the forward and reverse directions. The sheet gripper motor 110a is a drive unit to rotate the sheet gripper 110. The separation member motor 116a is a drive unit to move the separation members 116 in the width direction of the lamination sheet S. The branching member motor 118a is a drive unit to switch the position of the branching member 118.

Figure 5:
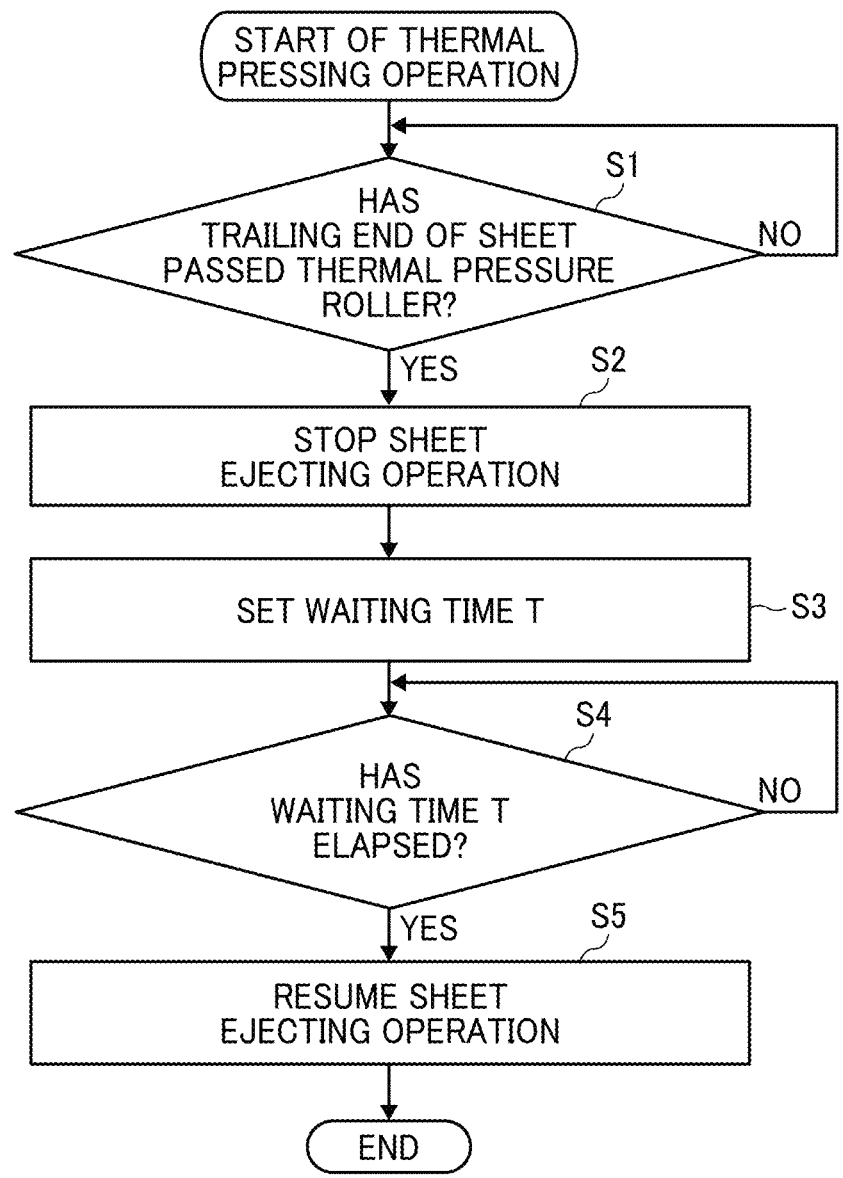
FIG. 5 is a flowchart of a sheet ejecting operation of a sheet laminator, according to an embodiment of the present disclosure.

FIG. 5 is a flowchart of a sheet ejecting operation of the sheet laminator 100, according to an embodiment of the present disclosure.

After the start of a thermal pressing operation in the fixing device that includes the thermal pressure roller pair 120, the sheet laminator 100 determines whether the trailing end of the lamination sheet S has passed through the thermal pressure roller pair 120, in step S1. For this determination, the sheet laminator 100 includes a detector (sensor) that detects the lamination sheet S, and the detector is, for example, the conveyance sensor C12 (see FIG. 3) disposed downstream from the thermal pressure roller pair 120 in the sheet conveyance direction of the lamination sheet S.

When the trailing end of the lamination sheet S completely passes through the thermal pressure roller pair 120 (YES in step S1), the sheet laminator 100 stops the sheet ejecting operation of the lamination sheet S in step S2, and holds the lamination sheet S by the ejection roller pair 121. Then in step S3, a timer in the sheet laminator 100 sets a waiting time T based on the size of the lamination sheet S detected by the size detection sensors C11, and the controller 127 determines whether the waiting time T has elapsed, in step S4. When the waiting time T has not elapsed (NO in step S4), step S4 is repeated until the waiting time T elapses. When the waiting time T has elapsed (YES in step S4), the sheet laminator 100 resumes the sheet ejecting operation of the lamination sheet S in step S5, and ejects the lamination sheet S.

As described above, the sheet laminator 100 stops the ejection roller pair 121, holds the lamination sheet S by the ejection roller pair 121, and resumes the sheet ejecting operation after waiting for the waiting time T (required time) to elapse. Accordingly, the lamination sheet S is ejected after waiting for a decrease of the temperature of the thermally-pressed lamination sheet S, thus reducing the bending of the lamination sheet S.

Figure 6:
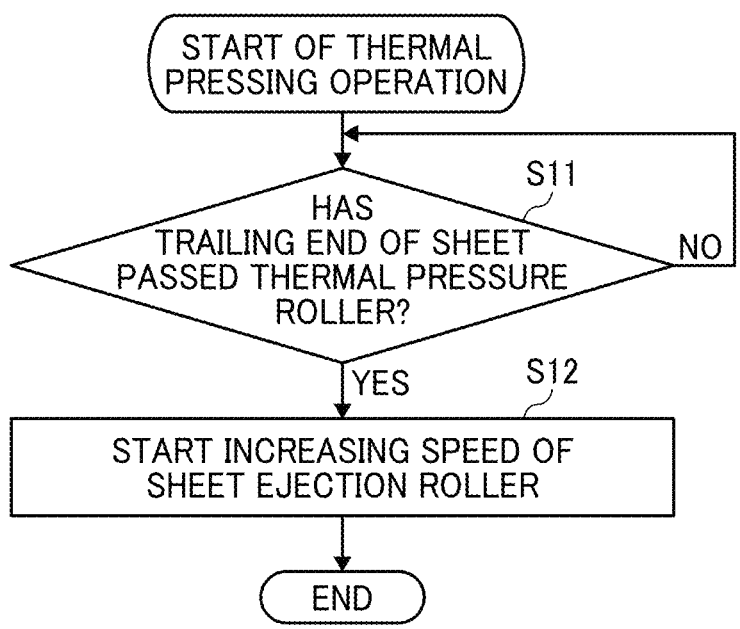
FIG. 6 is a flowchart of a sheet ejecting operation of a sheet laminator, according to another embodiment of the present disclosure.

FIG. 6 is a flowchart of a sheet ejecting operation of the sheet laminator 100, according to another embodiment of the present disclosure.

After the start of a thermal pressing operation in the fixing device that includes the thermal pressure roller pair 120, the sheet laminator 100 determines whether the trailing end of the lamination sheet S has passed through the thermal pressure roller pair 120, in step S11. For this determination, the sheet laminator 100 includes a detector (sensor) that detects the lamination sheet S. and the detector is, for example, the conveyance sensor C12 (see FIG. 3) disposed downstream from the thermal pressure roller pair 120 in the sheet conveyance direction of the lamination sheet S.

When the trailing end of the lamination sheet S has not completely passed through the thermal pressure roller pair 120 (NO in step S11), step S11 is repeated until the trailing end of the lamination sheet S completely passes through the thermal pressure roller pair 120. When the trailing end of the lamination sheet S has completely passed through the thermal pressure roller pair 120 (YES in step S11), the sheet laminator 100 increases the rotation speed of the ejection roller pair 121 in step S12 to increase the conveyance speed of the lamination sheet S. Accordingly, the time during which the leading end of the thermally-pressed lamination sheet S contacts the stacking surface of the sheet ejection tray 104 or the uppermost surface of the stacked sheets SG is shortened, and thus the bending of the lamination sheet S can be reduced.

Figure 7:
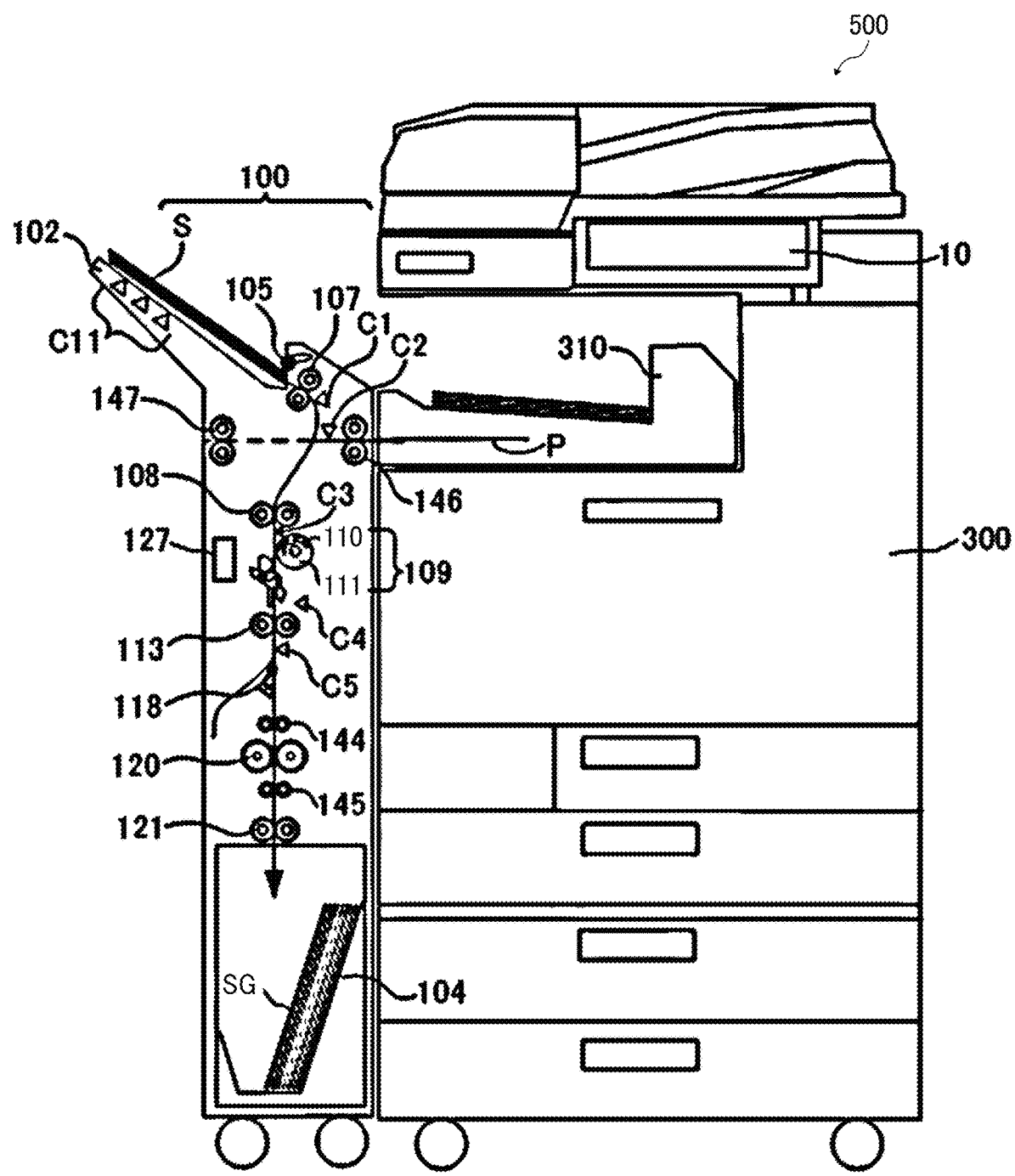
FIG. 7 is a diagram illustrating an overall configuration of an image forming apparatus including a sheet laminator according to an embodiment of the present disclosure.

FIG. 7 is a diagram illustrating an overall configuration of an image forming system including the sheet laminator according to an embodiment of the present disclosure and an image forming apparatus.

An image forming system 500 includes an image forming apparatus 300 that forms an image on, for example, an inner sheet P, and the sheet laminator 100 as an external sheet processing apparatus. The sheet laminator 100 includes a sheet tray 102 on which lamination sheets P are stacked, and receives inner sheets P fed from the image forming apparatus 300 to the sheet laminator 100 via a relay device 310. Accordingly, the image forming apparatus 300 (e.g., a printer or a copier) can insert an inner sheet P on which an image is formed into the lamination sheet S in an in-line system. Thus, the image forming system 500 can perform a series of operations of, in this order, the feeding of the lamination sheet 5, the separation of the lamination sheet S, the insertion of the inner sheet P into the lamination sheet 5, and the sheet laminating operation by application of heat and pressure without using manpower.

An operation panel 10 is disposed in an exterior portion of the image forming apparatus 300. The operation panel 10 serves as a display operation device to display information in the image forming apparatus 300 and receives an operation input by a user, in addition, the operation panel 10 also serves as a notification device that issues a perceptual signal to the user. Alternatively, a notification device other than the operation panel 10 may be separately disposed in the image forming apparatus 300.

Figure 8:
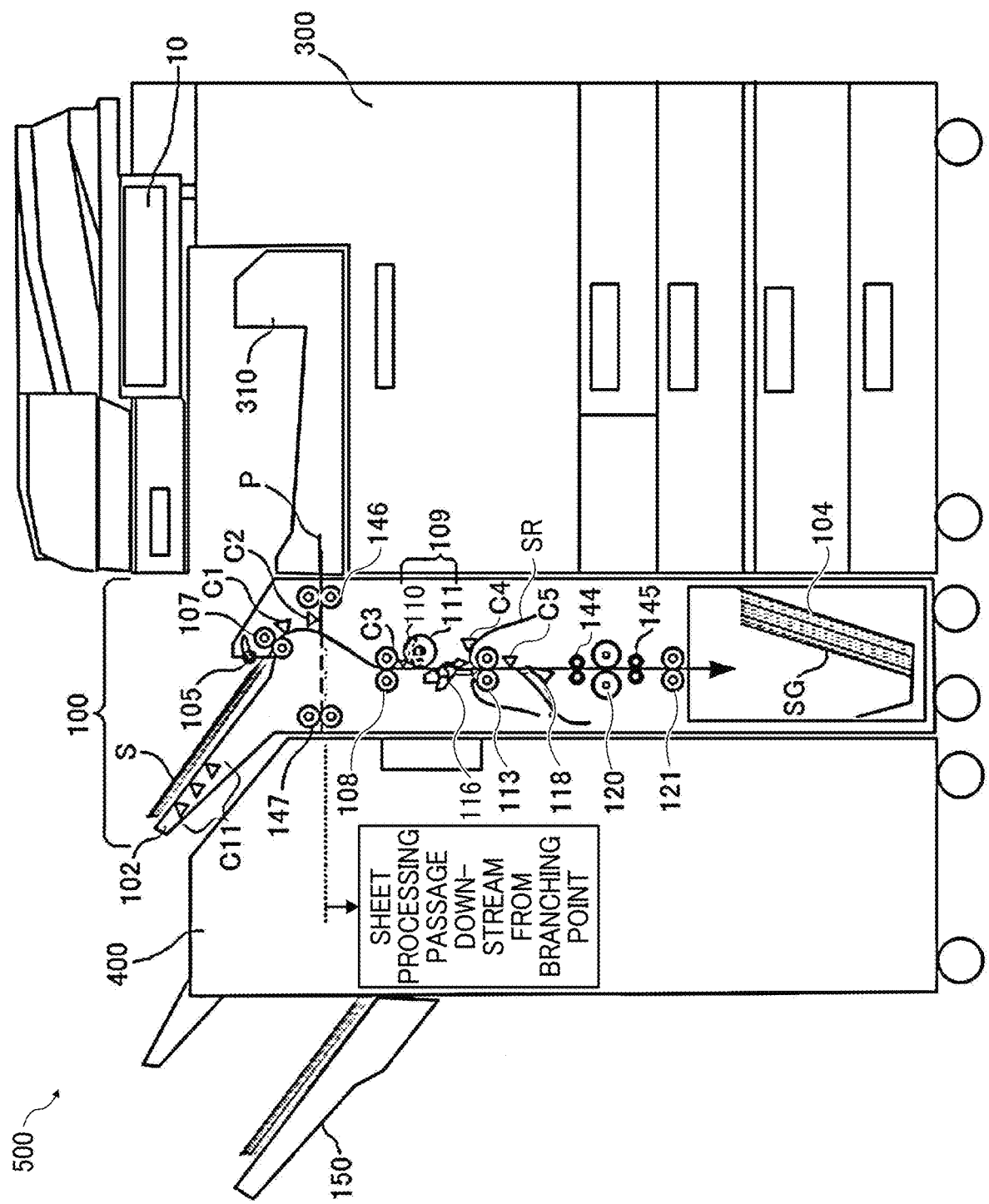
FIG. 8 is a diagram illustrating an overall configuration of an image forming system including a sheet laminator according to an embodiment of the present disclosure.

FIG. 8 is a diagram illustrating another overall configuration of an image forming system including a sheet laminator according to another embodiment of the present disclosure, and an image forming apparatus.

The image forming system 500 includes the image forming apparatus 300, the relay device 310, the sheet laminator 100, and a post-processing apparatus 400.

The image forming system 500 according to the present embodiment feeds an inner sheet P on which an image is formed by the image forming apparatus 300 from the sheet laminator 100 via the relay device 310. The post-processing apparatus 400 serving as a post-processing apparatus other than the sheet laminator 100 is disposed downstream from the sheet laminator 100 in the sheet conveyance direction. As described above, the post-processing apparatus 400 that serves as a post-processing apparatus other than the sheet laminator 100 is disposed downstream from the sheet laminator 100 in the sheet conveyance direction. By so doing, when a print job that does not require the sheet laminating operation and requires another post-processing operation (e.g., the binding operation or the sheet folding operation) is executed, the image forming system 500 causes a sheet (i.e., the inner sheet P) conveyed from the image forming apparatus 300 to be simply passed through the sheet laminator 100 to convey to the post-processing apparatus 400. Accordingly, the post-processing apparatus 400 can perform the post-processing operation on the sheet (i.e., the inner sheet P). As a result, the image forming system 500 can be used according to the needs of the user without reducing the efficiency. As the image forming system 500 illustrated in FIG. 8, the post-processing apparatus 400 is provided to perform the post-processing operations including the punching operation and the stapling operation, on the lamination sheet S ejected from the image forming apparatus 300 through the sheet laminator 100 (in other words, on the lamination sheet S without the sheet laminating operation). In such a case, the lamination sheet S is ejected to an ejection tray 150 of the post-processing apparatus 400 after the post-processing operation has been performed on the lamination sheet S.

Next, a detailed description is given of the fixing device according to an embodiment of the present disclosure.

Figure 9:
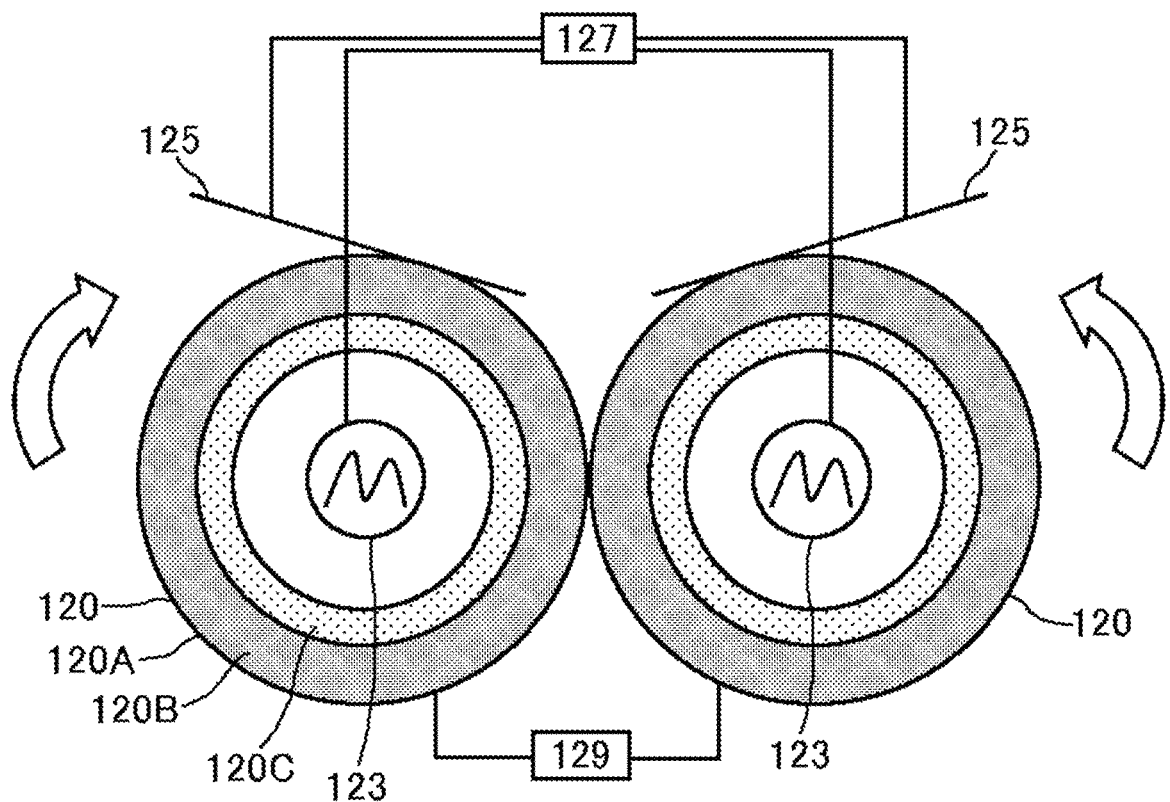
FIG. 9 is a schematic view of a fixing unit that includes the thermal pressure roller pair.

FIG. 9 is a schematic view of the fixing device including the thermal pressure roller pair 120.

The thermal pressure roller pair 120 is a roller including a fluororesin layer (perfluoroalkoxy tube or PEA tube) 120A as a surface layer, a rubber layer 120B as an elastic layer disposed close to the heater 123 from the surface layer, and a core metal portion 1200 at the center portion close to the heater 123 from the elastic layer. By using a fluororesin layer as the surface layer, dirt is less likely to adhere to the surface layer. However, since the fluororesin layer is easily damaged by heat, the continuous rotation operation of the thermal pressure roller pair 120 before stopping is required in some cases. The thermal pressure roller pair 120 is formed as a pair of rollers between which a nip region for nipping the lamination sheet S is formed. The heater 123 serving as a heating unit is provided inside each of the rollers of the thermal pressure roller pair 120 to heat the thermal pressure roller pair 120. The thermistors 125 each serving as a temperature detector are disposed facing the thermal pressure roller pair 120 at the entrance of the nip region to detect the temperature of the thermal pressure roller pair 120 that is heated. The thermistors 125 and the heaters 123 are connected to the controller 127. Further, a drive unit 129 (corresponding to the drive unit) that rotates the thermal pressure roller pair 120 is connected to the thermal pressure roller pair 120. The thermal pressure roller motor 129a (see FIG. 4) is an example of the drive unit 129.

A description is now given of the configuration of the sheet laminator 100.

Figure 10:
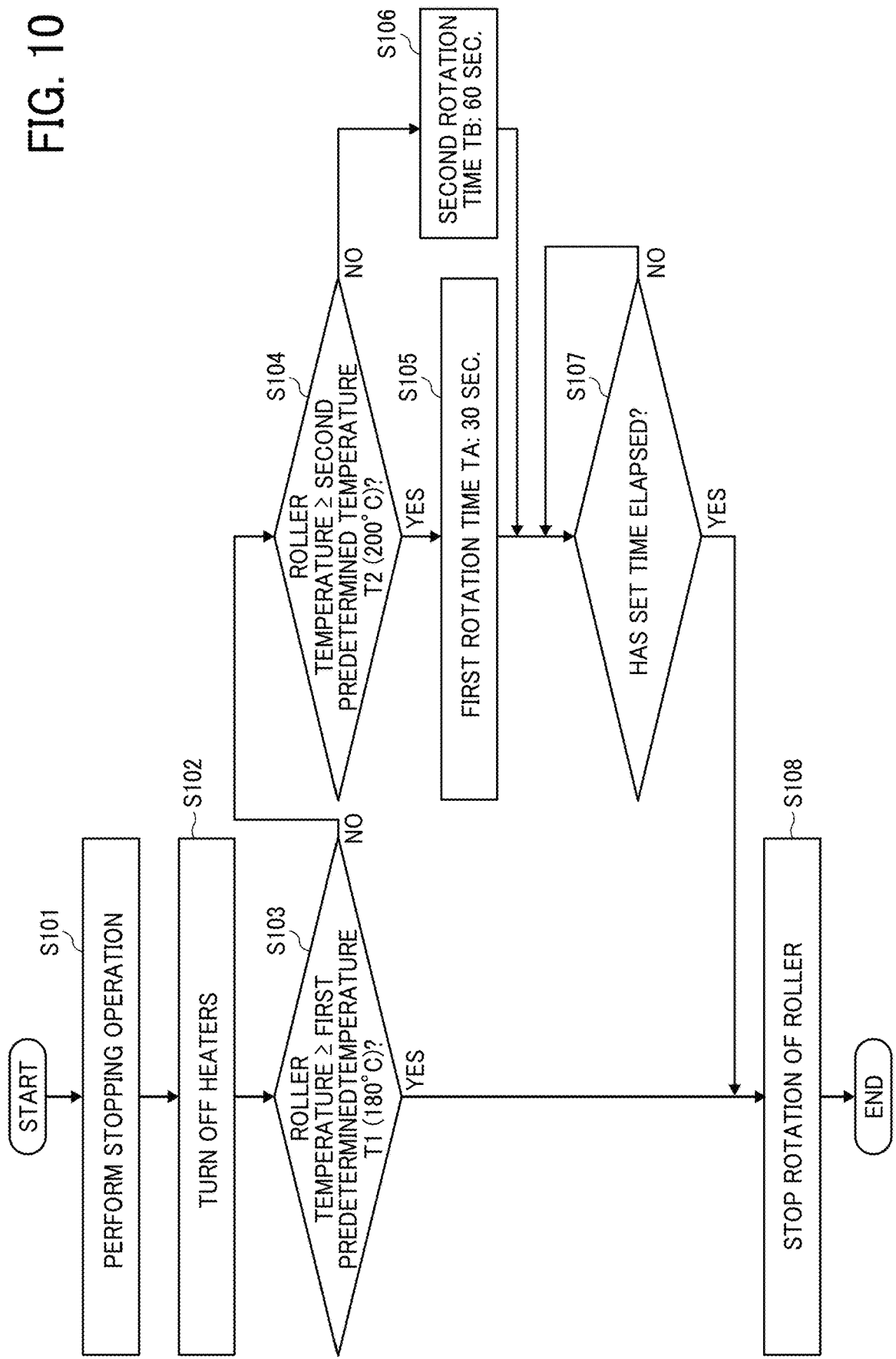
FIG. 10 is a flowchart of a stopping process of the thermal pressure roller pair according to a first embodiment of the present disclosure.

FIG. 10 is a flowchart of a stopping process of the thermal pressure roller pair according to a first embodiment of the present disclosure.

In the present embodiment, the controller 127 of the sheet laminator 100 determines the state of the thermal pressure roller pair 120 based on the detection result of the temperature of the thermal pressure roller pair 120 with the thermistors 125, and selects an immediate stop of the thermal pressure roller pair 120 or a stop of the thermal pressure roller pair 120 after the rotation operation based on the state of the thermal pressure roller pair 120. By executing the appropriate stop control based on the temperature of the thermal pressure roller pair 120 after the stopping operation is performed on the thermal pressure roller pair 120 in the sheet laminator 100, the thermal pressure roller pair 120 can be stopped without being damaged.

More specifically, when the stopping operation is performed on the thermal pressure roller pair 120 in step S101, in other words, when an abnormal condition occurs, the controller 127 immediately turns off the heaters 123 in consideration of safety in step S102. When an abnormal condition occurs, the heaters 123 are immediately turned off. The controller 127 causes the thermal pressure roller pair 120 to rotate at an appropriate stop control of the thermal pressure roller pair 120 to safely stop the sheet laminator 100. Then, in step S103, the roller temperature of the thermal pressure roller pair 120 at the immediate turnoff of the heaters 123 is detected with the thermistors 125, and the controller 127 determines whether the roller temperature of the thermal pressure roller pair 120 is equal to or smaller than a first predetermined temperature T1 that is 180° C. to determine whether the thermal pressure roller pair 120 is rotated or not.

When the roller temperature of the thermal pressure roller pair 120 at the immediate turnoff of the thermal pressure roller pair 120 is equal to or smaller than the first predetermined temperature T1 that is 180° C. (YES in step S103), the controller 127 immediately stops the rotation of the thermal pressure roller pair 120 in step S108.

On the other hand, when the roller temperature of the thermal pressure roller pair 120 at the immediate turnoff of the thermal pressure roller pair 120 is greater than the first predetermined temperature T1 that is 180° C. (NO in step S103), the controller 127 determines whether the roller temperature of the thermal pressure roller pair 120 is equal to or lower than a second predetermined temperature T2 that is 200° C. in step S104. The relation of the first predetermined temperature T1 and the second predetermined temperature T2 is expressed as the second predetermined temperature T2>the first predetermined temperature T1, in other words, the second predetermined temperature T2 is greater than the first predetermined temperature T1.

When the roller temperature is equal to or lower than the second predetermined temperature 12 that is 200° C. (YES in step S104), the controller 127 sets the rotation time of the thermal pressure roller pair 120 to a first rotation time TA that is 30 seconds in step S105. On the other hand, when the roller temperature is greater than the second predetermined temperature that is 200° C. (NO in step S104), the controller 127 sets the rotation time of the thermal pressure roller pair 120 to a second rotation time TB that is 60 seconds in step S106. In other words, the thermal pressure roller pair 120 is stopped after the rotation operation. The relation of the first rotation time TA and the second rotation time TB is expressed as the second rotation time TB>the first rotation time TA, in other words, the second rotation time TB is greater than the first rotation time TA. The minimum duration time (rotation time) of the rotation operation of the thermal pressure roller pair 120 is determined based on the state when the sheet laminator 100 is stopped. By so doing, the controller 127 causes the thermal pressure roller pair 120 not to rotate more than necessary and can reduce the stopping operation time.

Then, the controller 127 determines whether the set time (i.e., 30 seconds or 60 seconds) has elapsed in step S107. When the set time has not elapsed (NO in step S107), step S107 is repeated until the set time elapses. When the set time has elapsed (YES in step S107), the rotation of the thermal pressure roller pair 120 is stopped in step S108, and the stopping process is completed.

The amounts of the first predetermined temperature T1, the second predetermined temperature T2, the first rotation time TA, and the second rotation time TB can be changed as appropriate.

Figure 11:
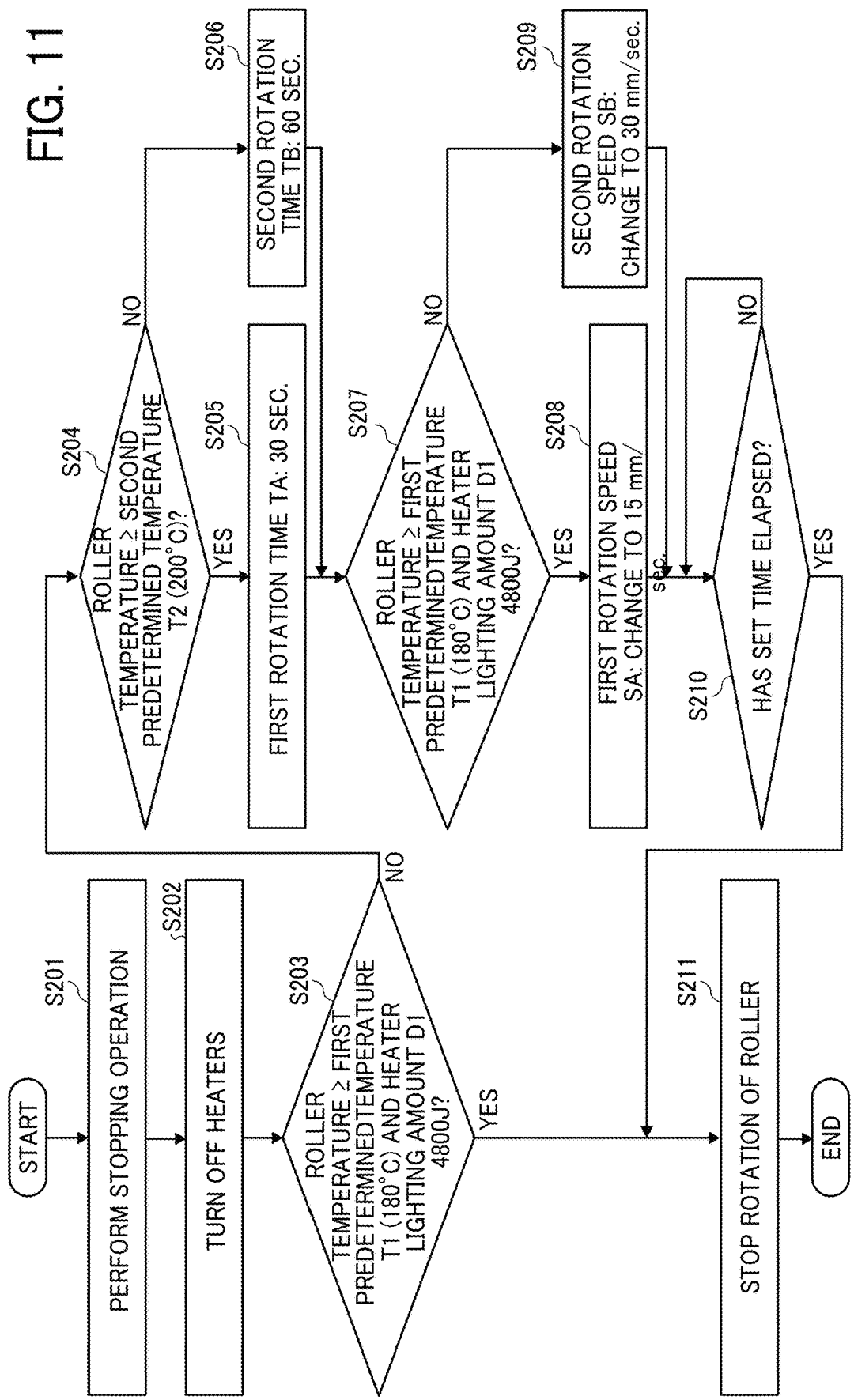
FIG. 11 is a flowchart of a stopping process of the thermal pressure roller pair according to a second embodiment of the present disclosure.

FIG. 11 is a flowchart of a stopping process of the thermal pressure roller pair according to a second embodiment of the present disclosure.

In the present embodiment, the controller 127 of the sheet laminator 100 determines the state of the thermal pressure roller pair 120 based on the detection result of the temperature of the thermal pressure roller pair 120 with the thermistors 125 and the determination of heater lighting amount (obtained by multiplying time by lighting percentage) by the controller 127. Then, the controller 127 selects an immediate stop of the thermal pressure roller pair 120 or a stop of the thermal pressure roller pair 120 after the rotation operation based on the state of the thermal pressure roller pair 120. Instead of the detection of the temperature of the thermistors 125, the controller 127 may determine the state of the thermal pressure roller pair 120 based on the heater lighting amount. By executing an appropriate stop control over the thermal pressure roller pair 120 based on the heater lighting amount immediately before the stop of the sheet laminator 100, the thermal pressure roller pair 120 can be stopped without being damaged. Since this operation does not depend on the sensor information (i.e., thermistor information), the sheet laminator 100 can be safely stopped even at the time of the abnormal condition of the sensor.

More specifically, when the stopping operation is performed on the thermal pressure roller pair 120 in step S201, in other words, when an abnormal condition occurs, the controller 127 immediately turns off the heaters 123 in consideration of safety in step S202. When an abnormal condition occurs, the heaters 123 are immediately turned off. The controller 127 causes the thermal pressure roller pair 120 to rotate at an appropriate stop control of the thermal pressure roller pair 120 to safely stop the sheet laminator 100. Then, in step S203, the roller temperature of the thermal pressure roller pair 120 at the immediate turnoff of the heaters 123 is detected with the thermistors 125, and the controller 127 determines whether the roller temperature of the thermal pressure roller pair 120 is equal to or smaller than the first predetermined temperature T1 that is 180° C. and equal to or smaller than a heater lighting amount D1 that is 4800J to determine whether the thermal pressure roller pair 120 is rotated or not.

Figure 12:
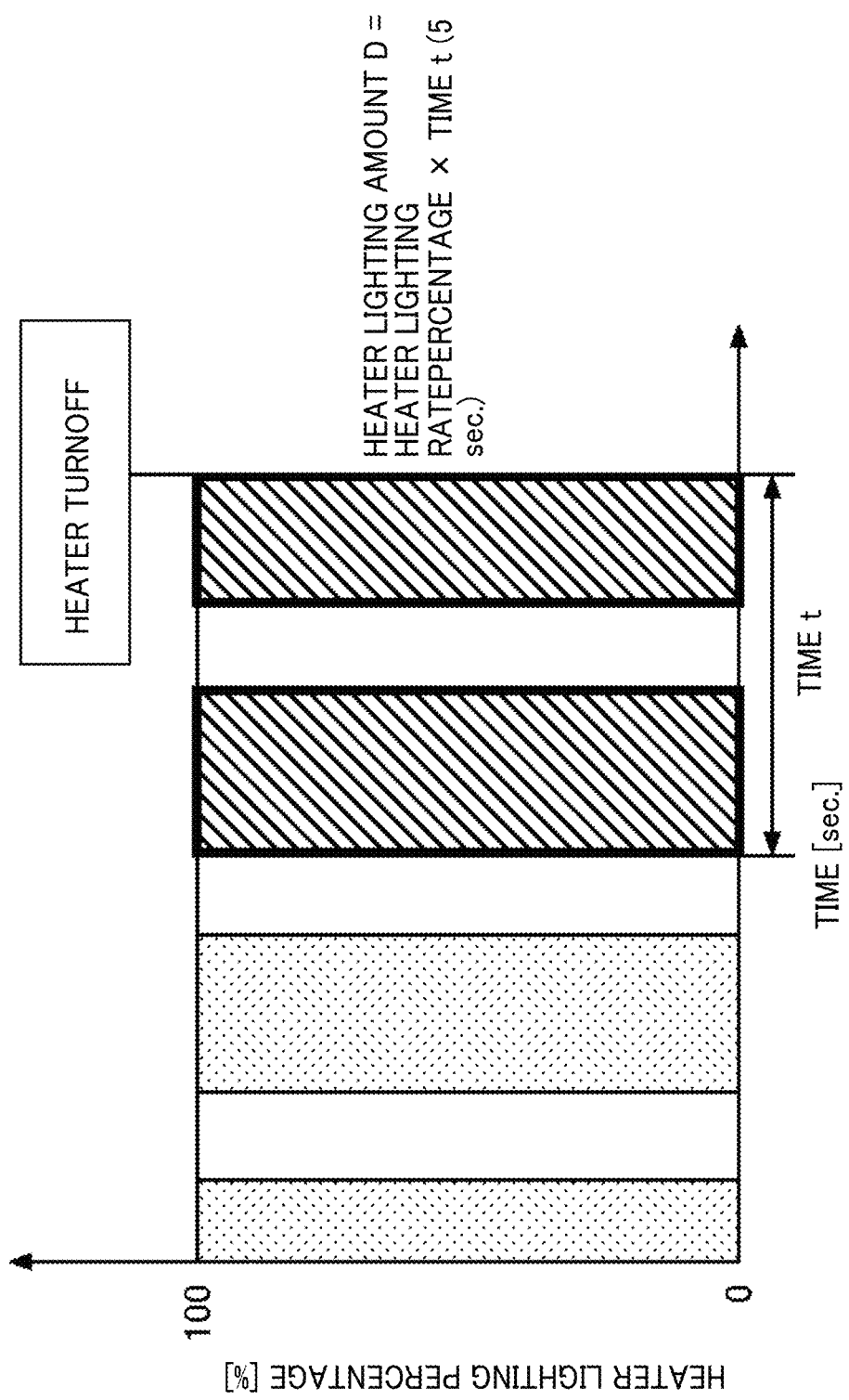
FIG. 12 is a graph of a heater lighting amount obtained by multiplying a time by a heater lighting percentage.
Figure 13:
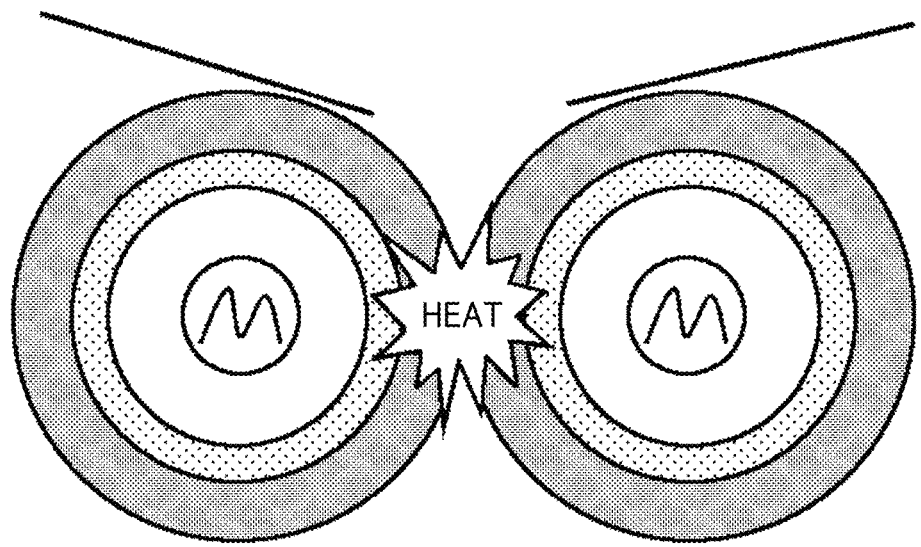
FIG. 13 is a schematic view of a fixing unit in the related art indicating damage on rollers due to heat when the fixing roller pair stops at an abnormal stop of the image forming apparatus.
Figure 14:
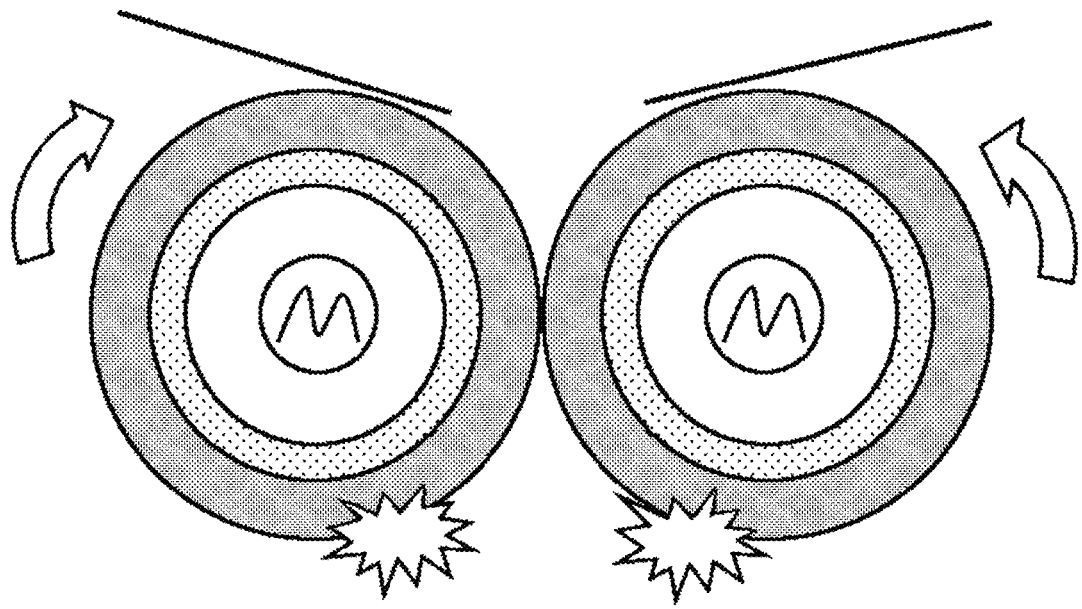
FIG. 14 is a schematic view of a fixing unit in the related art preventing damage on rollers due to heat generated by rotating the fixing roller pair for a given period of time during the abnormal stop of the image forming apparatus.

FIG. 12 is a graph of the heater lighting amount obtained by multiplying a time by a heater lighting percentage.

As illustrated in FIG. 12, the heater lighting amount indicates the heater lighting percentage per 5 seconds that is equal to a predetermined time t from the immediate turnoff of the heaters at occurrence of the stopping operation. In other words, the heater lighting amount D is obtained by multiplying a time t by a heater lighting percentage. The heater lighting amount D is expressed as the heater lighting amount D=time t×heater lighting percentage.

When the controller 127 determines that the condition of step S203 is satisfied, in other words, the roller temperature of the thermal pressure roller pair 120 is equal to or smaller than the first predetermined temperature T1 that is 180° C. and equal to or smaller than a heater lighting amount D1 that is 4800J (YES in step S203), the controller 127 causes the thermal pressure roller pair 120 to immediately stop the rotation in step S211.

On the other hand, when the controller 127 determines that the condition of step S203 is not satisfied, in other words, the roller temperature of the thermal pressure roller pair 120 is greater than the first predetermined temperature T1 that is 180° C. and greater than the heater lighting amount D1 that is 4800J (NO in step S203), the controller 127 determines whether the roller temperature of the thermal pressure roller pair 120 is equal to or smaller than the second predetermined temperature T2 that is 200° C. in step S204. The relation is expressed as the second predetermined temperature T2>the first predetermined temperature T1.

When the roller temperature is equal to or smaller than the second predetermined temperature T2 that is 200° C. (YES in step S204), the controller 127 sets the rotation time of the thermal pressure roller pair 120 to the first rotation time TA that is 30 seconds in step S205. On the other hand, when the roller temperature is greater than the second predetermined temperature T2 that is 200° C. (NO in step S204), the controller 127 sets the rotation time of the thermal pressure roller pair 120 to the second rotation time TB that is 60 seconds in step S206 (the second rotation time TB>the first rotation time TA). In other words, the thermal pressure roller pair 120 is stopped after the rotation operation. The minimum duration time (rotation time) of the rotation operation of the thermal pressure roller pair 120 is determined based on the state when the sheet laminator 100 is stopped. By so doing, the controller 127 causes the thermal pressure roller pair 120 not to rotate more than necessary and can reduce the stopping operation time.

Then, in step S207, the controller 127 determines whether the roller temperature of the thermal pressure roller pair 120 at the immediate turnoff of the heaters 123 is equal to or smaller than the first predetermined temperature T1 that is 180° C. and equal to or smaller than the heater lighting amount D1 that is 4800J and sets the roller rotation speed depending on the detection result, By changing the rotational speed of the thermal pressure roller pair 120 based on the state of the thermal pressure roller pair 120 at the stop of the sheet laminator 100, the temperature of the thermal pressure roller pair 120 is quickly lowered and the waiting time of the user can be reduced.

When the controller 127 determines the condition of step S207 is satisfied, in other words, the roller temperature of the thermal pressure roller pair 120 at the immediate turnoff of the heaters 123 is equal to or smaller than the first predetermined temperature T1 that is 180° C. and equal to or smaller than the heater lighting amount D1 that is 4800J (YES in step S207), the controller 127 changes the rotational speed of the thermal pressure roller pair 120 to a first rotational speed SA that is 15 mm/sec in step S208. On the other hand, when the controller 127 determines the condition of step S207 is not satisfied, in other words, the roller temperature of the thermal pressure roller pair 120 at the immediate turnoff of the heaters 123 is greater than the first predetermined temperature T1 that is 180° C. and greater than the heater lighting amount D1 that is 4800J (NO in step S207), the controller 127 changes the rotational speed of the thermal pressure roller pair 120 to a second rotational speed SB that is 30 mm/sec in step S209 (the second rotational speed SB>the first rotational speed SA).

Then, the controller 127 determines whether the set time (i.e., 30 seconds or 60 seconds) has elapsed in step S210. When the set time has not elapsed (NO in step S210), step S210 is repeated until the set time elapses. When the set time has elapsed (YES in step S210), the rotation of the thermal pressure roller pair 120 is stopped in step S211, and the stopping process is completed.

The amounts of the first predetermined temperature T1, the second predetermined temperature T2, the first rotation time TA, the second rotation time TB, the first rotational speed SA, the second rotational speed SB, and the heater lighting amount D1 can be changed as appropriate.

In addition, the set thresholds of the respective parameters may be increased, for example, the first predetermined temperature T1, the second predetermined temperature T2, a third predetermined temperature T3 or more, to perform control having more detailed conditions.

As described above, according to the sheet laminator of an embodiment of the present disclosure, when an abnormal condition occurs, the power supply to the fixing heater is immediately turned off, and the immediate stop of the thermal pressure roller pair 120 or the stop of the thermal pressure roller pair 120 after the rotation operation is selected based on the state of the thermal pressure roller pair 120. By so doing, the stopping operation time can be reduced and damage on the rollers such as deformation of the thermal pressure roller pair in the nip region can be prevented. When the thermal pressure roller pair 120 is rotated, the stopping operation time is reduced by changing the roller rotation time or the roller rotation speed depending on the roller temperature or the heater lighting percentage, so that the recovery time to the subsequent print job can be shortened.

Aspects of the present invention are, for example, as follows.

Aspect 1

In Aspect 1 of the present disclosure, a sheet laminator includes a fuser pressure member, a heater, a drive device, and circuitry. The fuser pressure member thermally fixes a two-ply sheet and a sheet medium inserted between two sheets of the two-ply sheet. The heater heats the fuser pressure member. The driver rotates the fuser pressure member. In response to a pause of a rotation of the fuser pressure member, the circuitry turns off a power supply to the heater, and perform one of immediately stopping the fuser pressure member or rotating the fuser pressure member and stopping the fuser pressure member after the rotation of the fuser pressure member, based on a state of the fuser pressure member, Aspect 2

In Aspect 2 of the present disclosure, according to Aspect 1, the circuitry, in response to occurrence of an abnormal condition, further immediately turns off the power supply to the heater, and perform one of immediately stopping the fuser pressure member or rotating the fuser pressure member and stopping the fuser pressure member after the rotation of the fuser pressure member, based on the state of the fuser pressure member.

Aspect 3

In Aspect 3 of the present disclosure, according to Aspect 1 or 2, the sheet laminator further includes a temperature detector to detect a temperature of the fuser pressure member. The circuitry further determines the state of the fuser pressure member based on a temperature detected by the temperature detector.

Aspect 4

In Aspect 4 of the present disclosure, according to any one of Aspects 1 to 3, the circuitry is connected to the heater. The circuitry further determines the state of the fuser pressure member based on a lighting amount of the heater.

Aspect 5

In Aspect 5 of the present disclosure, according to any one of Aspects 1 to 4, the circuitry further determines a duration time of the rotation of the fuser pressure member in accordance with the state of the fuser pressure member.

Aspect 6

In Aspect 6 of the present disclosure, according to any one of Aspects 1 to 5, the circuitry further changes a rotational speed of the fuser pressure member in accordance with the state of the fuser pressure member.

Aspect 7

In Aspect 7 of the present disclosure, according to any one of Aspects 1 to 6, the fuser pressure member is a pair of rollers.

Aspect 8

In Aspect 8 of the present disclosure, according to Aspect 7, the fuser pressure member includes a fluororesin layer as a surface layer, an elastic layer interior of the fluororesin layer, and a core metal portion interior of the elastic layer. The core metal portion is at a center portion of the fuser pressure member.

Aspect 9

In Aspect 9 of the present disclosure, an image forming system includes the sheet laminator according to any one of Aspects 1 to 8, and an image forming apparatus to form an image on a sheet medium to be supplied to the sheet laminator.

The present disclosure is not limited to specific embodiments described above, and numerous additional modifications and variations are possible in light of the teachings within the technical scope of the appended claims. It is therefore to be understood that, the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

The effects described in the embodiments of this disclosure are listed as the examples of preferable effects derived from this disclosure, and therefore are not intended to limit to the embodiments of this disclosure.

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of this disclosure and are included in the scope of the invention recited in the claims and its equivalent.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A sheet laminator comprising:
a fuser pressurizer to thermally fix a two-ply sheet and a sheet medium inserted between two sheets of the two-ply sheet;
a heater to heat the fuser pressurizer;
a driver to rotate the fuser pressurizer; and
circuitry configured to, in response to a pause of a rotation of the fuser pressurizer,
turn off a power supply to the heater; and
perform one of:
immediately stopping the fuser pressurizer; or
rotating the fuser pressurizer and stopping the fuser pressurizer after the rotation of the fuser pressurizer, based on a state of the fuser pressurizer.

2. The sheet laminator according to claim 1,
wherein, the circuitry is further configured to, in response to occurrence of an abnormal condition,
immediately turn off the power supply to the heater; and
perform one of:
immediately stopping the fuser pressurizer; or
rotating the fuser pressurizer and stopping the fuser pressurizer after the rotation of the fuser pressurizer, based on the state of the fuser pressurizer.

3. The sheet laminator according to claim 1, further comprising a temperature detector to detect a temperature of the fuser pressurizer,
wherein the circuitry is further configured to determine the state of the fuser pressurizer based on a temperature detected by the temperature detector.

4. The sheet laminator according to claim 1,
wherein the circuitry is connected to the heater, and
wherein the circuitry is further configured to determine the state of the fuser pressurizer based on a lighting amount of the heater.

5. The sheet laminator according to claim 1,
wherein the circuitry is further configured to determine a duration time of the rotation of the fuser pressurizer in accordance with the state of the fuser pressurizer.

6. The sheet laminator according to claim 1,
wherein the circuitry is further configured to change a rotational speed of the fuser pressurizer in accordance with the state of the fuser pressurizer.

7. The sheet laminator according to claim 1,
wherein the fuser pressurizer is a pair of rollers.

8. The sheet laminator according to claim 7,
wherein the fuser pressurizer includes:
a fluororesin layer as a surface layer;
an elastic layer interior of the fluororesin layer; and
a core metal portion interior of the elastic layer, the core metal portion being at a center portion of the fuser pressurizer.

9. An image forming system comprising:
the sheet laminator according to claim 1; and
an image forming apparatus to form an image on a sheet medium to be supplied to the sheet laminator.

10. The sheet laminator according to claim 3, wherein:
the circuitry is further configured to perform the rotating and stopping of the fuser pressurizer when the detected temperature is greater than a first predetermined temperature.

11. The sheet laminator according to claim 10, wherein:
the circuitry is further configured to immediately stop the fuser pressurizer when the detected temperature is equal to or less than the first predetermined temperature.

12. The sheet laminator according to claim 4, wherein:
the circuitry is configured to perform the rotating and stopping of the fuser pressurizer when the lighting amount of the heater over a predetermined time is greater than a predetermined heater lighting amount.

13. The sheet laminator according to claim 3, wherein:
the circuitry is further configured to determine the state of the fuser pressurizer based on both the temperature detected by the temperature detector and a lighting amount of the heater.

14. The sheet laminator according to claim 5, wherein the duration time comprises a first rotation time when the state of the fuser pressurizer is within a first range and a second rotation time, longer than the first rotation time, when the state of the fuser pressurizer is within a second, higher-temperature range.

15. The sheet laminator according to claim 1, further comprising:
a sheet separator to separate the two sheets of the two-ply sheet to allow for the insertion of the sheet medium therebetween.

16. The sheet laminator according to claim 1, further comprising:
an ejection roller pair disposed downstream from the fuser pressurizer, wherein the ejection roller pair is to convey the two-ply sheet vertically downward toward a sheet ejection tray.

17. The sheet laminator according to claim 1, wherein:
the fuser pressurizer is to thermally fix the two-ply sheet in a nip region, and
the sheet laminator is to convey the two-ply sheet vertically downward through the nip region.

* * * * *